United States Patent

Escareno et al.

Patent Number: 5,926,086
Date of Patent: Jul. 20, 1999

[54] SYSTEM AND METHOD FOR VEHICLE THEFT PREVENTION AND RECOVERY

[76] Inventors: Joe Escareno, 17350 E. Temple Ave. No. 382, LaPuente, Calif. 91744; Manny Argomaniz, 5383 Yale St., Montclair, Calif. 91763

[21] Appl. No.: 09/006,394

[22] Filed: Jan. 13, 1998

Related U.S. Application Data

[63] Continuation-in-part of application No. 08/642,791, May 3, 1996, Pat. No. 5,742,227.

[51] Int. Cl.$^6$ .................................................. B60R 25/10
[52] U.S. Cl. ........................ 340/426; 340/430; 340/460; 340/539; 340/825.44; 307/10.2
[58] Field of Search ................... 340/426, 460, 340/430, 825.44, 539; 307/10.2

[56] References Cited

U.S. PATENT DOCUMENTS

| | | | |
|---|---|---|---|
| 5,319,351 | 6/1994 | Beezley, Jr. | 340/426 |
| 5,742,227 | 4/1998 | Escareno et al. | 340/426 |
| 5,790,015 | 8/1998 | Litsuka | 340/426 |

*Primary Examiner*—Daniel J. Wu
*Attorney, Agent, or Firm*—Robert J. Schaap

[57] ABSTRACT

A vehicle theft prevention and recovery system is activated by a pager upon receiving a telephonic signal from a pager service, in response to a call from a vehicle owner or operator, to activate anti-theft means including a warning to a thief in the vehicle, means for disabling the vehicle engine, and visual and audible alarm signal devices to identify the vehicle as stolen. The means for disabling the vehicle engine preferably disables the engine after a predetermined countdown warning to any occupant in the vehicle. In addition, the theft prevention and recovery system includes a light display on the exterior of the vehicle to warn outsiders of an impending vehicle disoperation. In addition, an embodiment is disclosed in which radar can be used from another source as, for example, a law enforcement vehicle, to trigger the operation of the vehicle disablement. Finally, an embodiment is also incorporated in which a positioning system, such as a global positioning system, will inform a central station of the location of the vehicle and the central station can initiate operation of the vehicle engine disablement when the vehicle is in a relatively safe location to cause such disablement.

21 Claims, 3 Drawing Sheets

FIG.—1

SYSTEM AND METHOD FOR VEHICLE THEFT PREVENTION AND RECOVERY

RELATED APPLICATION

This application is a continuation-in-part of our U.S. patent application Ser. No. 08/642, 791, filed May 3, 1996, now U.S. Pat. No. 5,742,227, for Vehicle Theft Prevention and Recovery System.

BACKGROUND OF THE INVENTION

1. Field of the Invention

The present invention relates generally to vehicle theft prevention and recovery systems and, more particularly, to such a system wherein a pager at the vehicle activates functions including at least a warning to a thief in the vehicle and disabling the vehicle engine.

2. Brief Description of the Related Art

Vehicle theft has long been widespread, particularly with respect to automotive vehicles, with resultant high costs to society, including high insurance rates to cover losses and services of law enforcement organizations.

The present invention aids in prevention of vehicle theft and facilitates the location identification of stolen vehicles. The disabling system, according to the invention, is not activated until after the vehicle is stolen. The thief is not aware of the disabling device until the thief is automatically warned of impending vehicle disablement.

Remotely operable devices or systems for disabling vehicles are known in the prior art, although a variety of anti-theft devices and equipment have been developed, vehicle thieves have conceived various ways to disable or circumvent any systems and devices.

Relatively expensive and complex systems, such as LOJAC™ provide after-the-fact retrieval systems, which well-known systems do not actually prevent theft of vehicles, but may enable location of a vehicle after its theft. It is desirable that an anti-theft system operate to prevent vehicle theft or high-jacking in progress or interrupt the theft in the early stages before the vehicle and criminal evidence can move undesirably far away.

It is also desirable to have a system which effectively transmits the location of the vehicle. In this way, a central source can monitor the location of the vehicle and initiate the anti-theft system. It is further desirable to provide some means whereby the anti-theft system can be activated from a remote source, such as law enforcement vehicle, by means of signal from the remote source, such as radar.

Certain prior art systems are activated by a call to a central service operate to disable a vehicle, although such systems present legal liability problems related to disablement of a vehicle under hazardous circumstance, with no warning to the thief in the vehicle. Further, such systems tend to be relatively expensive and complex. Such arrangements include those of the U.S. Pat. No. 4,067,411 to Conley and U.S. Pat. No. 5,276,728 to Pagiliaroli.

Certain prior art systems involve specialized components and functions. Smith U.S. Pat. No. 5,349,329 involves a transmitter carried by a driver, and a receiver and disabling switch in the vehicle. When the receiver does not detect the signal from the transmitter, the disabling switch disables the vehicle. Such a system is of relatively limited use and is subject to problems, as upon any failure of the system. The system of Beezley, Jr. U.S. Pat. No. 5,319,351 is activated by the seating of a person in the vehicle driver's seat. If not disarmed by the driver-owner by operating a disarming switch, the system reacts to police radars and gives an alarm. Such a system is of rather limited use, and is subject to operator error.

U.S. Pat. No. 4,962,522 to Marian relates to an irrigation system activated by a paging station which is telephoned to send a signal to a pager at an irrigation site for remote activation of sprinklers.

The present invention addresses and relieves problems and shortcomings of prior devices and systems.

SUMMARY OF THE INVENTION

The present invention provides a vehicle theft prevention and recovery system which includes a pager at a vehicle which is activated upon receiving a telephone call, as from a pager service. The pager service is called and alerted by the vehicle owner or operator upon becoming aware of theft or attempted theft of the vehicle. The pager, thus activated, initiates a radio signal having digital modulation for digital readout to provide respective formats to respective activators to cause actuators to actuate anti-theft functions, including the provision of a warning to an occupant or thief in the vehicle, and disabling of the vehicle engine. Other functions are preferably also activated, including the audible alarms and lights to enable policy or other persons to identify the vehicle as stolen.

The activated devices or functions include means, audible and/or visible, to an operator or thief in the vehicle of impending vehicle disablement to occur within a stated time, such as three minutes or less. This enables the thief or occupant to leave the street or roadway and park the vehicle, thus relieving the vehicle owner or operator of liability of damages caused by the vehicle being disabled in a hazardous situation, such as the fast lane of a freeway or other relatively fast traffic. Such warning may employ a countdown display on the vehicle instrument panel or a speaker system advising the thief-occupant of the vehicle of impending vehicle disablement.

The activated functions may include a device for activating the vehicle horn, a device for activating a siren, a device for energizing a radio beacon to enable police-tracking, a device for energizing the vehicle emergency flasher lights, as well as a killswitch device for disabling the vehicle engine.

Additional triggers for initiating the activated functions include, for example, door locks and lights which can be activated upon receiving a triggering telephonic signal. Thus, for example, door locks could be activated to lock the vehicle doors and lights could be flashed on and off.

The vehicle theft and recovery system can also be operated with a main control center in which a user of the system can contact the main control center to determine those numbers on a cellular phone to be actuated in order to activate an appropriate sequence. After the sequence is initiated, the paging system transmits data which is used for activating the anti-theft functions on the vehicle as, for example, generating audible alarms or lights in to enable law enforcement or other persons to identify the vehicle as a stolen vehicle.

The present invention can also optionally include an advisory system on the exterior of the vehicle to advise outsiders of impending vehicle disablement.

The activated devices can be initiated telephonically through the pager system, as aforesaid. The activated functions may also be initiated or triggered by the use of a radar beam. For this purpose, the anti-theft and recovery system would include a radar detector responsive to transmitted radar beams as, for example, from a law enforcement vehicle. This would also cause ultimate vehicle disablement.

The present invention also may incorporate a position determining means as, for example, a global positioning system to determine the approximate position of the vehicle. In this way, a central station can monitor the location of the vehicle and initiate a triggering signal for the activated functions when the vehicle is in a relatively safe position to cause a vehicle disablement.

The car alarm functions are re-set upon vehicle owner or operator re-gaining use of the vehicle.

The system according to the recovery arrangement, involving relatively low-cost equipment and reasonable charges of a paging service which, even including additional charges for a "voice panel" or a pager capable of alphanumeric messages, is relatively inexpensive and affordable.

BRIEF DESCRIPTION OF THE DRAWINGS

Figure 1:
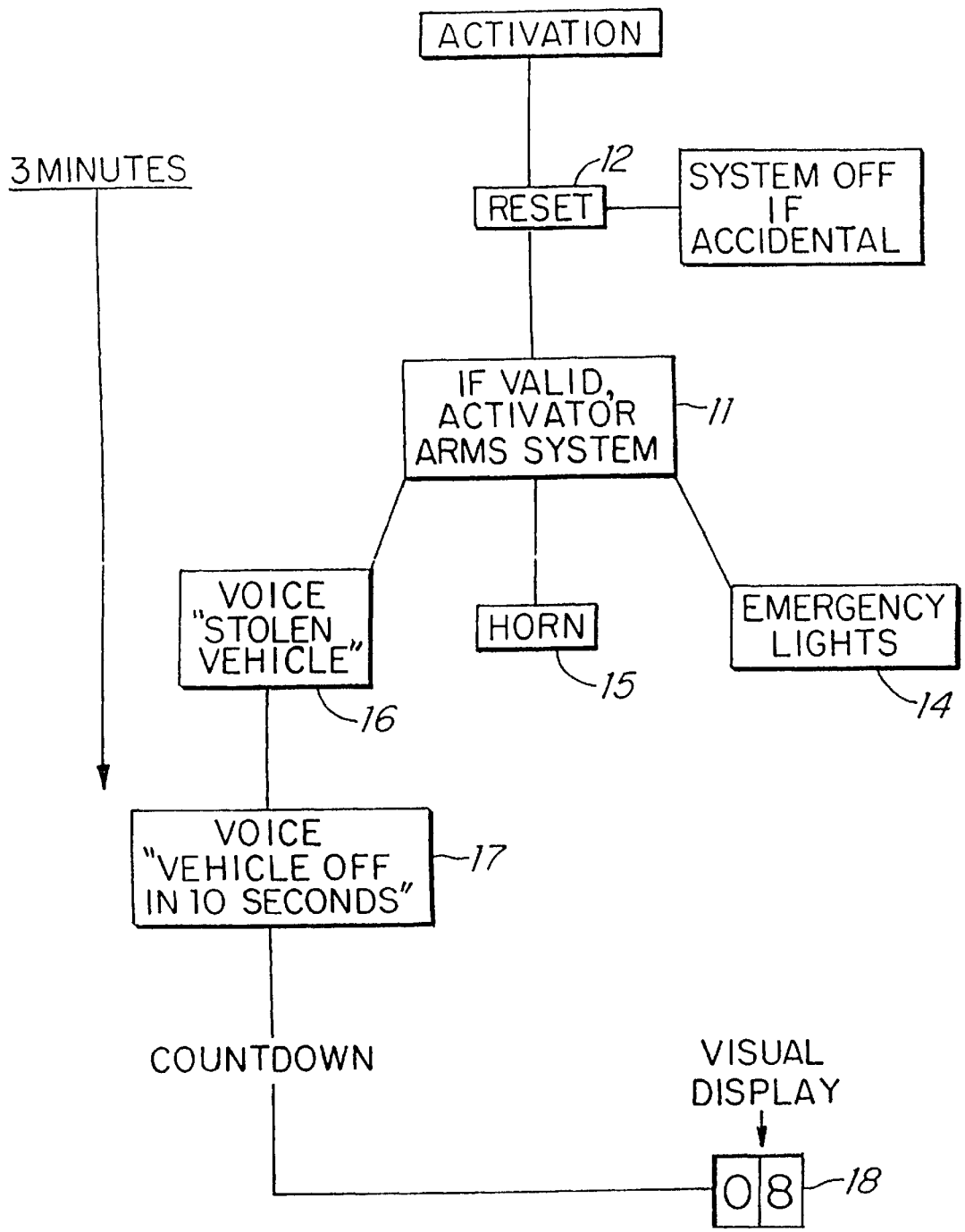
Figure 2:
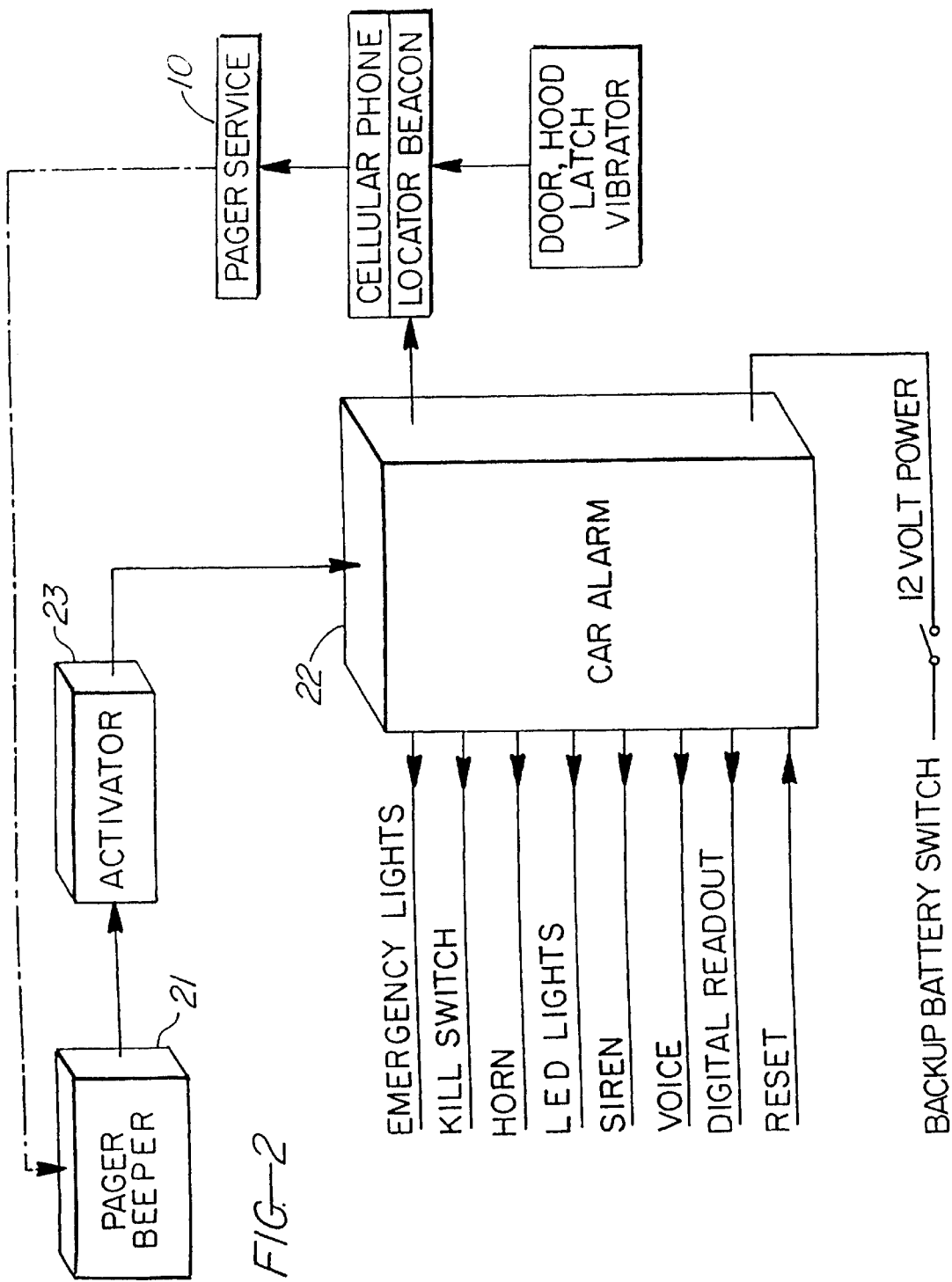
Figure 3:
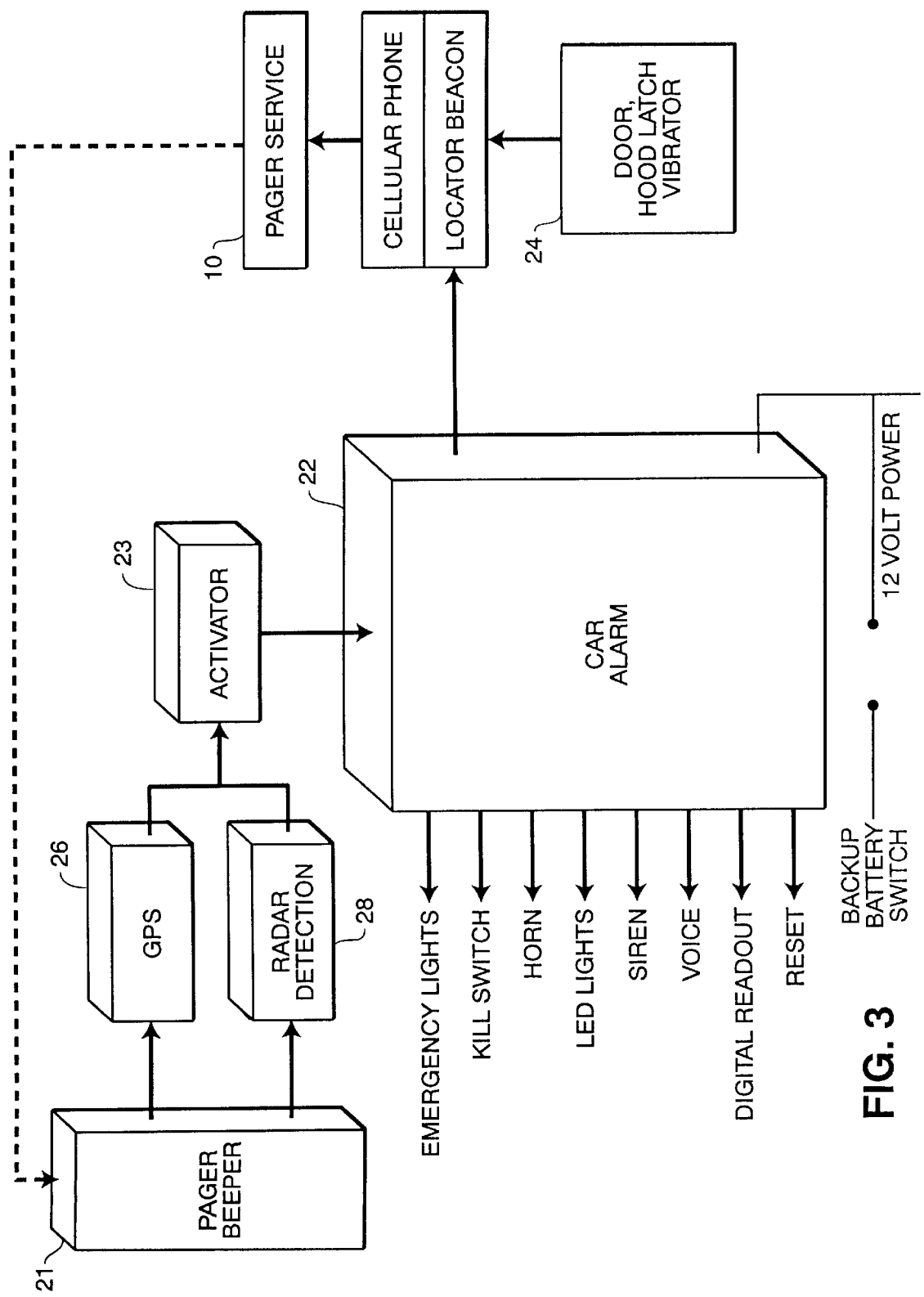

Having thus described the invention in general terms, reference will now be made to the accompanying drawings in which:

FIG. 1 is a functional flow diagram of a system according to the present invention;

FIG. 2 is a block diagram illustration of interrelationships between a pager, pager service and vehicle anti-theft functions controlled in accordance with the present invention; and FIG. 3 is a block diagram showing a modified form of a vehicle theft and recovery system which incorporates radar triggering means and position determining means for locating the position of a vehicle.

DETAILED DESCRIPTION OF A PREFERRED EMBODIMENT

Referring now in more detail and by reference characters to the drawings, the vehicle anti-theft and recovery system is activated promptly upon a person realizing that his vehicle is being or has been stolen, whereupon vehicle recovery commences by the person telephoning his paging service 10. This call is made from any convenient and available telephone, such as a public phone, business phone, citizen's band phone, etc., whereupon the pager service calls the pager 21 at the vehicle initiating a beeper signal.

Upon receipt of a beeper signal, the pager causes operation of a reset function 12 which checks beeper signal validity, as not being caused by error on-board the vehicle, such as a drive accidentally re-setting the system. If the signal is confirmed as valid, the system is energized or armed, and the beeper signal is amplified and causes activator 11 to energize respective function devices, including a device 16 for presenting a voice warning and of impending vehicle disablement and a device 17 for presenting a voiced count-down in second to vehicle disablement. A visual display device 18, which may be synchronous with the voice warning, is preferably provided.

The functions activated may include, as indicated in FIG. 2, energizing all emergency lights, the later activation of the killswitch to disable the engine, the activation of the vehicle horn and/or a siren, the energizing of a panel display of light-emitting diodes or other lights, etc. The panel display of light emitting diodes or other lights can be incorporated with the interior of the vehicle and/or the exterior of the vehicle. When located on the exterior of the vehicle, a light pattern generation would advise outsiders of an impending vehicle disablement.

The respective functions are activated by the application of a digital code to activator 23 which causes actuator circuitry (not shown) in car alarm 22 to actuate specific functions.

The entire sequence can be accomplished within approximately three minutes, so that a vehicle thief stranded in a disabled vehicle is readily identified. The vehicle is stopped after it has been driven only a relatively short distance by engine disablement in typically a conspicuous location while audible and visual indications make the vehicle readily identified as stolen.

As indicated earlier, the audible voice and/or visual display warning provide time for the thief to drive the vehicle out of traffic at the side of the road or street, thus to avoid the vehicle being stopped in a dangerous situation as in a fast lane of traffic, etc., thus to eliminate or reduce the hazards of personal injury, damage to vehicles, etc. This reduces the vehicle owner or operator to exposure to liability for injury to persons, death, or damages to vehicles.

According to FIG. 2, pager 21 may receive a digital formatted signal from a pager service 10 to thus provide a display or other signal, in the event the vehicle battery has become disconnected, as in a robbery attempt, whereupon a backup battery switch applies battery power for the vehicle.

An alarm beeper may be utilized on the vehicle for the purpose of notifying the vehicle owner or operator that the vehicle is being tampered with, thus to alert the vehicle owner or person that called the paging service to activate the pager and the anti-theft system in the vehicle. Such an alarm beeper may, of course, be activated by unauthorized opening of a door, vehicle hood, etc.

FIG. 3 illustrates a modified form of the vehicle anti-theft and recovery system of the invention, which is similar in construction and operation to that illustrated in FIG. 2. In this particular embodiment, a door latch and/or hood latch could be provided and connected with a door latch or hood latch vibrator 24, as illustrated. Thus, upon opening of a door or the hood of the vehicle, audible or visual alarms could be generated as, for example, a flashing light pattern, horns or the like, and preferably in combination therefor. In like manner, the door and hood latch vibrator system 24 could initiate an anti-theft cycle by sending a signal directly to the pager beeper for initiation of the activated functions. For this purpose, the door and hood latch vibrator or other sensor associated therewith would be connected directly to the actuator 23.

In accordance with the modified system, as illustrated in FIG. 3, a location positioning system, such as a global positioning system 26, is interposed between the pager beeper 21 and the activator 23. In like manner, a radar detection system, including a radar detector, 28 is also interposed between the pager beeper 21 and the activator 23.

The radar detector would be operated to be responsive to radar from a source as, for example, radar initiated from a law enforcement vehicle. Thus, in the event that a law enforcement vehicle was attempting to apprehend a car thief who would not voluntarily cease operation of the stolen vehicle, then a radar gun in a law enforcement vehicle could be used to generate a radar beam and the radar detector 28 would be responsive to that beam to initiate operation of the activator 23. It should be understood that other airborne triggering signals other than radar could also be used.

The global positioning system 26 is a highly effective addition in that it can serve to inform a central location, which may be the same as the paging source, of the position of a stolen vehicle. Thus, the central station can learn the approximate position of that vehicle and use a telephonic signal to operate the activator 23 in the manner as previously described. This is effective in that the central station can determine, potentially from a grid map, whether or not the vehicle is in a safe location to disable the operation of the vehicle.

The anti-theft and recovery system could be designed so that the system is set for operation when the ignition is turned off. A pre-programmed amount of time would be employed to enable an authorized operator of the vehicle to exit the vehicle. However, when that time has expired, the alarm system is initiated and the initiation of that alarm system may be so indicated by a single flashing indicator light.

The opening of a vehicle door after the alarm has been set would initiate a programmable timer (not shown) countdown to actual alarm activation. If the ignition key is not then turned on, and a hidden activation switch is not actuated before the predetermined time period expires, the vehicle is disabled. Moreover, audible and/or visual alarms, such as horns, lights and the like, can also be activated.

It should also be recognized that vibration detectors could be located within the vehicle and which would be connected to the activator for initiating the alarm system in the event of vibration or other motion of the vehicle.

The system of the invention can also be provided with a manually set valet mode. A hidden switch which may be hidden, for example, under the dashboard of the vehicle or other location, can be manually actuated by the authorized user of the vehicle while the ignition is still activated to switch to the valet mode. This will disable the anti-theft feature but will not disable a car jacking feature. The indicator light would use a separate flashing signal as, for example, three flashes in sequence, to provide indication of the valet mode. Transmission of a pager signal while the vehicle is in the valet mode can be operated to disable the starter of the vehicle and energize the horn or flashing lights, or both, for a pre-selected period of time. However, the alarm system can be de-energized by again actuating the hidden manually operable switch.

It can be seen that in the event of a car jacking, a thief's progress can be immediate inhibited by sending a pager signal which would be detected by the vehicle. Signals would immediately flash the vehicle headlights and, perhaps, energize the horn of the vehicle or other sound generating system on the vehicle as, for example, a siren or the like, and for a pre-selected period of time, e.g. twenty-five minutes. The signal would also affect the ignition system or the fuel pump by de-energizing the fuel pump or the ignition system for this pre-selected time period before the vehicle is completed disabled.

Initiation of the various warning signals can be performed manually in sequence by an authorized user of the vehicle. For example, the party attempting to stop a car jacking could initiate a first telephonic signal which would send a page to the vehicle advising, through a speaker system in the vehicle, of an impending disablement. A second signal, initiated by an authorized individual, would start the flashing of the vehicle headlights or other light system and honk the horn of the vehicle or otherwise generate other audible sounds for a pre-selected time period. The third signal would disable the ignition system or the fuel pump by turning it on and off for a predetermined period of time prior to complete disablement of the vehicle. Another telephonic signal could actually be used to restart the vehicle in a normal position. The internal memory of a programmer in the unit will maintain the status of the vehicle, even when the battery is removed. Once the ignition is turned off, that ignition is disabled until the alarm system is re-set.

Thus, there has been shown and described a novel system and method for vehicle theft prevention and recovery which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

Having thus described the invention, what we desire to claim and secure by letters patent is:

1. A vehicle theft prevention and recovery system comprising:
   pager means at the vehicle to receive a telephonic signal and to initiate an airborne signal with selected signal modulation for data readout formatted to provide pre-determined formats;
   activator means for receiving said formatted data from the pager means and transmit respective digital formats to respective actuators to actuate at least means for providing a count-down warning of interference with vehicle operation to an occupant of the vehicle;
   radar detection means coupled to said activator means to receive a radar trigger signal from a remote source to initiate the operation of said activator means; and
   means for disabling the operation of the vehicle.

2. A theft prevention and recovery system of claim 1, wherein:
   the means for disabling causes a disabling of the operation of the vehicle a pre-determined time after the means for disabling is activated.

3. A theft prevention and recovery system according to claim 1, wherein:
   said means for warning a vehicle occupant provides a voice warning of vehicle disablement within a specific time.

4. A theft prevention and recovery system according to claim 3, wherein:
   said warning means provides a vocal audible count-down in seconds to vehicle engine disablement.

5. A theft prevention and recovery system according to claim 1 wherein:
   said radar detection means is initiated from a radar source in a law enforcement vehicle.

6. A vehicle theft prevention and recovery system according to claim 1, wherein:
   said means for disabling the operation of the vehicle comprises killswitch means for disabling engine operation.

7. A vehicle theft prevention and recovery system according to claim 1, wherein:
   said theft prevention and recovery system comprises means to warn and alert persons outside the vehicle of impending disablement to avoid injury and damage.

8. A vehicle theft prevention and recovery system according to claim 7, wherein:
   said means for warning persons outside the vehicle comprises means for energizing a light display on the exterior of the vehicle.

9. A vehicle theft prevention and recovery system according to claim 7, wherein:

said means for alerting persons outside the vehicle comprises mans for activating and energizing a radio beacon to enable law enforcement tracing of the vehicle.

10. A vehicle theft prevention and recovery system comprising:

pager means at the vehicle to receive a telephonic signal and to initiate an airborne signal with selected signal modulation for data readout formatted to provide predetermined formats;

activator means for receiving said formatted data from the pager means and transmit respective digital formats to respective actuators to actuate at least means for providing a count-down warning of interference with vehicle operation to an occupant of the vehicle;

position determining means coupled to said activator means for determining the position of a vehicle and allowing for triggering of said activator means from a remote source; and means for disabling operation of the vehicle.

11. A vehicle theft prevention and recovery system of claim 10, wherein:

a central monitoring location is apprised of the location of the vehicle from the position determining means and initiates an airborne signal to initiate operation of the activator means.

12. A vehicle theft prevention and recovery system of claim 11, wherein:

said position determining means is a global positioning means.

13. A vehicle theft prevention and recovery system of claim 10, wherein:

the means for disabling disables the operation of the vehicle a predetermined time after the means for disabling is activated.

14. A vehicle theft prevention and recovery system of claim 10, wherein:

the theft prevention and recovery system comprises means to warn and alert persons outside the vehicle of impending disablement to avoid injury and damage.

15. A vehicle theft prevention and recovery system of claim 14, wherein:

said means for warning persons outside the vehicle comprises means for energizing a light display on the exterior of the vehicle.

16. A vehicle theft prevention and recovery system of claim 10, wherein:

said means for warning a vehicle occupant provides voice warning of vehicle disablement within a specific time.

17. A vehicle theft prevention and recovery system comprising:

pager means at said vehicle to receive a telephonic signal and to initiate an airborne signal with selected signal modulation for data readout formatted to provide predetermined formats;

activator means for receiving said formatted data from the pager means and transmit respective digital formats to respective actuators to actuate at least means for providing a count-down warning of interference with vehicle operation to an occupant of the vehicle;

radar detection means coupled to send activator means to receive a radar trigger signal from a remote source to initiate the operation of said activator means;

position determining means for determining the position of a vehicle coupled to said activator means for determining the position of a vehicle and allowing for triggering of said activator means from a remote source; and means for disabling operation of the vehicle.

18. A theft prevention and recovery system according to claim 17, wherein:

the means for disabling causes a disabling of the operation of the vehicle a predetermined time after the means for disabling is activated.

19. A theft prevention and recovery system according to claim 17, wherein:

said means for warning a vehicle occupant provides a voice warning of vehicle disablement within a specific time.

20. A theft prevention and recovery system according to claim 17, wherein:

said radar detection means is initiated from a radar source in a law enforcement vehicle.

21. A theft prevention and recovery system according to claim 17, wherein:

said theft prevention and recovery system comprises means to warn and alert persons outside the vehicle of impending disablement to avoid injury and damage.

* * * * *